(12) United States Patent
Kilcher et al.

(10) Patent No.: US 8,864,316 B2
(45) Date of Patent: Oct. 21, 2014

(54) OPTICAL MEMS SCANNING MICRO-MIRROR WITH SPECKLE REDUCTION

(75) Inventors: Lucio Kilcher, Montreux (CH); Nicolas Abele, Lausanne (CH); Faouzi Khechana, Preverenges (CH)

(73) Assignee: Lemoptix SA, Lausanne (CH)

( * ) Notice: Subject to any disclaimer, the term of this patent is extended or adjusted under 35 U.S.C. 154(b) by 226 days.

(21) Appl. No.: 13/638,217

(22) PCT Filed: Apr. 28, 2010

(86) PCT No.: PCT/EP2010/055760
§ 371 (c)(1),
(2), (4) Date: May 23, 2013

(87) PCT Pub. No.: WO2011/134513
PCT Pub. Date: Nov. 3, 2011

(65) Prior Publication Data
US 2013/0242275 A1    Sep. 19, 2013

(51) Int. Cl.
*G03B 21/28* (2006.01)
*G02B 5/02* (2006.01)
*G02B 27/48* (2006.01)
*G02B 26/08* (2006.01)

(52) U.S. Cl.
CPC ............... *G02B 27/48* (2013.01); *G03B 21/28* (2013.01); *G02B 5/0215* (2013.01); *G02B 5/0231* (2013.01); *G02B 5/0278* (2013.01); *G02B 26/0833* (2013.01)
USPC ............ 353/46; 353/99; 353/121; 359/213.1; 359/212.1; 359/318

(58) Field of Classification Search
USPC ............ 353/98, 99, 46, 50, 51; 348/742, 743, 348/771; 359/290, 291, 315, 316, 318, 247, 359/267, 205.1, 213.1, 212.2
See application file for complete search history.

(56) References Cited

U.S. PATENT DOCUMENTS

| 6,995,889 B2 * | 2/2006 | Li et al. ................. 359/211.2 |
| 2008/0165401 A1 | 7/2008 | Kasazumi |
| 2008/0212040 A1 * | 9/2008 | Aksyuk .......................... 353/99 |
| 2009/0161196 A1 | 6/2009 | Malfait |

* cited by examiner

*Primary Examiner* — William C Dowling
(74) *Attorney, Agent, or Firm* — Tarolli, Sundheim, Covell & Tummino LLP

(57) ABSTRACT

Optical MEMS scanning micro-mirror comprising: —a movable scanning micro-mirror (101) pivotally connected to a MEMS body (102) substantially surrounding the lateral sides of the micro-mirror; —an transparent prism (500, 600) substantially covering the reflection side of the micro-mirror; —wherein said prism has its outer face non-parallel to the micro-mirror neutral plane N-N, thereby providing a dual anti-speckle and anti-reflection effect, namely against parasitic light. The invention also provides the corresponding micro-projection system and method for reducing speckle.

15 Claims, 7 Drawing Sheets

US 8,864,316 B2

OPTICAL MEMS SCANNING MICRO-MIRROR WITH SPECKLE REDUCTION

This application is a National Phase Filing of PCT/EP2010/055760, filed Apr. 28, 2010, the subject matter of which is incorporated herein by reference in its entirety.

FIELD OF THE INVENTION

The present invention relates to an optical MEMS scanning micro-mirror comprising a movable scanning micro-mirror, a substrate covering a back face of said mirror and a transparent prism substantially covering the reflection side of the micro-mirror. The present invention also relates to a micro-projection system comprising such a micro-mirror, and a corresponding method for reducing speckle.

BACKGROUND OF THE INVENTION

Speckle is a phenomenon created with laser light sources, due to the fact that laser light is coherent. Parallels and synchronized wavefronts simultaneously hit the projection surface. When the light hits the surface, it creates constructive and destructive interference. The first category of interference induces an image deterioration that is often visible by human eye and/or by sensors. In addition to a loss of image quality, visual comfort of the viewer may also be affected.

Several techniques are used in order to remove or reduce speckle. In many cases, light coherence reduction techniques are used. For instance, the light hitting the projection surface is provided from various projection angles. Polarized laser light hitting a depolarized film is also used. Otherwise, illumination using various laser wavelengths may also be used.

Another approach consists in using vibration of the projection surface. The resulting systems are complex, expensive, and involve very specific hardware material.

WO2009/077198 describes an optical system comprising a coherent light source and optical elements for directing light from the source to a target. The optical elements include at least one diffusing element arranged to reduce a coherence volume of light from the source and a variable optical property element. A control system controls the variable optical property element such that different speckle patterns are formed over time at the target with a temporal frequency greater than a temporal resolution of an illumination sensor or an eye of an observer so that speckle contrast ratio in the observed illumination is reduced. The variable optical property element may be a deformable mirror with a vibrating thin plate or film. This solution requires modifying the projection system in order to integrate additional components, such as diffusing elements.

WO2007/112259 describes a system and method for reducing or eliminating speckle when using a coherent light source. A refracting device, comprising a birefringent material, is positioned such that the refracting device intercepts the coherent light. The refracting device rotates, thereby causing the ordinary and/or extraordinary beams to move. The human eye integrates the movement of the beams, reducing or eliminating laser speckle. The refracting device may include one or more optical devices formed of a birefringent material. Wave plates, such as a one-half wave plate, may be inserted between optical devices to cause specific patterns to be generated. Multiple optical devices having a different orientation of the horizontal component of the optical axis may also be used to generate other patterns. Furthermore, the refracting device may include an optical device having multiple sections of differing horizontal components of the optical axis. This solution involves a complex and expensive component, the rotating refracting device. Moreover, the integration of such device requires a specific global design.

Optical MEMS (Micro-Electro Mechanical Systems) are moving structures that are adapted to deflect light over time and space. These structures are usually made of silicon and are operated using different actuation principles including magnetic, electrostatic, piezoelectric and/or thermal.

Classically, MEMS mirrors are used in various optical applications and are usually delivered as stand-alone unprotected chips. When used in scanning applications for example, the incoming light is directly reflected on the mirror and usually does not transmit through any other material or media.

However, an unprotected chip makes the mirror surface subject to optical and mechanical degradations due to dust or other material deposition. Fabrication of unpackaged mirrors may also reduce the fabrication yield of such device due to its sensitivity to external handling and tooling processes. Therefore a packaged MEMS mirror is strongly recommended to obtain high quality mirrors and a high fabrication yield. Among packaged MEMS mirror technologies, wafer-level packaging technology is the most suited for high volume high yield manufacturing.

However when a mirror is protected, or encapsulated, with transparent or semi-transparent windows, if light is passing through the window, a light reflection will occur at both air-window interfaces. These reflections are usually considered as parasitic reflections. A standard way to reduce these reflections is the deposition of anti-reflective coatings on both sides of the window, enabling the reduction of the parasitic reflections down to approximately 0.1% of the incoming light intensity 300 (FIG. 3) if the coating is designed for a single wavelength, and down to 0.3% to 0.4% if the coating is designed for a larger wavelength spectrum such as the entire visible light (430-670 nm).

However, when using a high power light source, such values of parasitic reflection may result in a strong degradation of the reflected light homogeneity. Indeed, as an example, for a laser-based MEMS scanning mirror projection system with a resolution of 640×480 pixels, a parasitic reflection as low as 0.3%, for a coated air-window interface, it will result in a fix parasitic pixel-light spot with a light intensity 1000 times stronger than any other pixel on the projected image or video.

A consequence of such parasitic reflection is that the user will experience a brighter fix light spot in the projection field, which is a clear showstopper for standard use of the device and for customer adoption of the device.

U.S. Pat. No. 6,962,419 describes a package for micro-mirror elements having a window that is not parallel to the substrate upon which the micro-mirrors are formed. Such configuration enables the reflected light to be oriented outside from the projection zone. However, this arrangement does not reduce perceived speckle by a user.

Thus, there is a need for a novel micro-projection system with reduced speckle having MEMS micro-mirrors and MEMS components in general, that do not present the above mentioned drawbacks, namely the complexity and costs problems caused by using specific configurations with additional components used only for speckle reduction. There is also a need for a system avoiding undesired parasitic reflection of the light on the protection window.

SUMMARY OF THE INVENTION

A general aim of the invention is therefore to provide an improved device and method for reducing or suppressing speckle in a laser micro-projection system and avoiding parasitic reflection of the light on the protection window.

Another aim of the invention is the elimination of the parasitic effect of the light reflection by intermediate media, within an optical scanning or projection field.

Still another aim of the invention is to provide such method and device for reducing or suppressing speckle, providing efficient performances at reasonable cost.

Yet another aim of the invention is to provide such method and device for reducing or suppressing speckle, using components that can be fully integrated into a laser micro-projection device.

These aims are achieved thanks to the optical MEMS scanning micro-mirror and to the micro-projection system defined in the claims.

There is accordingly provided an optical MEMS scanning micro-mirror comprising:
- a movable scanning micro-mirror pivotally connected to a MEMS body substantially surrounding the lateral sides of the micro-mirror;
- a transparent prism substantially covering the reflection side of the micro-mirror;
- said prism having an outer face and an inner face, wherein said outer face is not parallel to said inner face, thereby providing a dual anti-speckle and anti-reflection effect, namely against parasitic light reflection.

The prism is advantageously part of the MEMS packaging. Therefore, no additional component is required to improve anti-speckle performance.

Such functionalized protection system for optical components includes protective transparent or semi-transparent window or prism, leading to a strong reduction of parasitic light reflection.

In such an arrangement, the back face is opposite of reflection face or side.

In an embodiment, the MEMS further comprises a substrate covering a back face of said mirror.

In an advantageous embodiment, the prism outer face is non-parallel to the micro-mirror neutral plane N-N.

In a variant, the anti-speckle prism has its inner face also non-parallel to the micro-mirror neutral plane N-N.

In another variant, the anti-speckle prism is provided with a transparent cover having a substantially flat outer face. In other words, the outer face is parallel to the neutral plane N-N. In such a case, at least a portion of the cover inner face is preferably substantially parallel with the prism outer face. This enables a further variant, in which at least a portion of the prism outer face and the cover inner face are in direct contact, thus avoiding the presence of air between the faces. In a still further variant, the cover inner face is preferably substantially parallel with the micro-mirror neutral plane N-N.

In a preferred embodiment, the scanning mirror pivoting angle and dimensions and the prism dimensions are linked together and determined so that the light emitted from the scanning mirror is oriented to pass through the prism.

In a still further variant, the prism is provided with an absorbent surface to absorb parasitic light.

The prism is advantageously provided with a triangular profile.

The anti-speckle prism is advantageously manufactured using a transparent parallelepiped portion provided with a plurality of successive structures made of rectilinear segments and aligned on the outer face thereof. The successive structures are preferably substantially triangular. Such triangular structures may be made in a single or multiple structures made of plastic injection or made of molded thermoplastic.

In a variant, the triangular shape structures are provided on both sides thereof. Gluing or bonding may be used to attach the components. In a variant, the triangular shape structures are made in a single or multiple structures made of plastic injection. In another variant, the triangular shape structures are made in a single or multiple structures made of molded thermoplastic, such as Poly Methyl Methacrylate (PMMA). In a still further variant, the triangular shape structures are made in a single or multiple structures made of melted glass in the specific shape in a mould.

The invention also provides a micro-projection system for projecting light on a projection surface comprising:
- at least one coherent light source, and preferably a plurality of light sources with a beam combiner;
- optical elements, in the optical path between said coherent light source and said projection surface,
- an optical MEMS scanning micro-mirror as previously described.

The prism configuration involves a thickness varying according to the position. Thus, several parallel light beams crossing the prism have different path lengths to go through. Therefore, the prism is specifically adapted to modify the phase between adjacent light beam, resulting in a reduced coherence, and reduced speckle effect. More preferably, this characteristic of the prism has no impact on other design features. For instance, the prism does not comprise any curved surface, does not modify the direction of the beams, and does not modify the alignment of the light beams crossing the prism.

Such system avoids parasitic light reflection in the desired field of projection and provides an anti-speckle effect.

In an advantageous variant, the prism is made of quarter-wave plate material, thus providing double functionality.

Such a micro-projection system may comprise in addition to the micro-mirror and the light source(s), a quarter-wave plate, a beam splitter, beam combiner, etc.

The invention further provides a method for reducing speckle in a micro-projection system adapted for projecting light on a projection surface, comprising:
- providing a light with at least one coherent light source;
- directing light from the light source to the projection surface;
- providing a scanning micro-mirror for deviating light from said light source so as to scan a projected image onto said projecting surface, said micro-mirror being provided with neutral axis N-N corresponding to a non pivoted position of said micro-mirror,
- covering the reflection side of the micro-mirror with a transparent prism, said prism having an outer face and an inner face, said outer face being not parallel to said inner face, thereby providing a dual anti-speckle and anti-reflection effect.

The required time for the light beams to pass through the prism depends on the thickness of the crossing zone. Due to its specific profile involving unparallel faces, when parallel light beams cross at different positions of the prism, they have different path lengths to travel through. For instance, if the crossing time increases from left to right, the time difference, though extremely small, is sufficient to reduce the coherence of the emitted light and thereby reduce the perceived speckle by a viewer or a sensor, while not affecting image sharpness.

In other words, the different parallel light beams have different path lengths for passing through the prism, requiring different durations. This reduces the constructive and destructive interferences when the beams reach the screen.

BRIEF DESCRIPTION OF THE DRAWINGS

The foregoing and other purposes, features, aspects and advantages of the invention will become apparent from the following detailed description of embodiments, given by way of illustration and not limitation with reference to the accompanying drawings, in which.

DETAILED DESCRIPTION OF THE INVENTION

For clarity, as is generally the case in representation of microsystems, the various figures are not drawn to scale.

The present invention is based on studies performed by the inventors into the origins of parasitic light reflection onto transparent or semi-transparent surfaces for scanning and projection purposes.

The invention proposes to change the geometry of the protection window to avoid parasitic reflection, provide an anti-speckle effect, while keeping the assembly simplicity of such window with other components.

Figure 1:
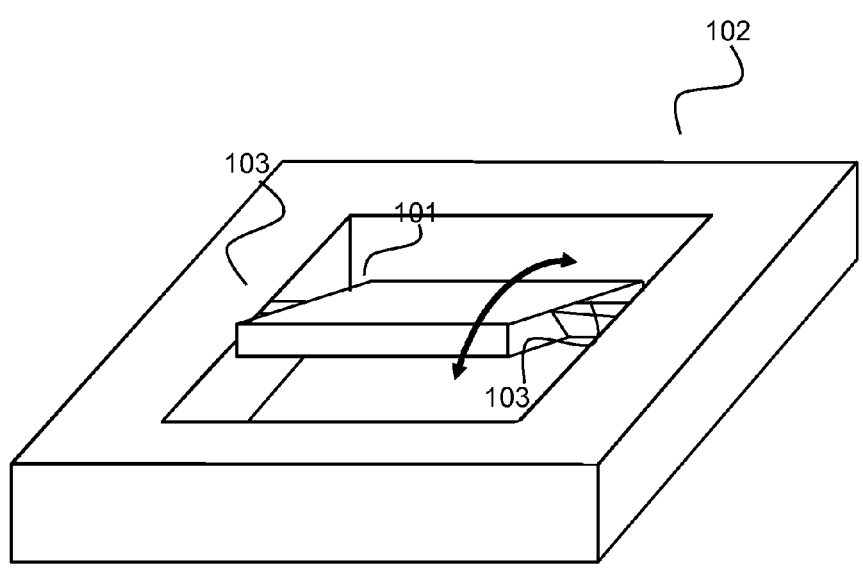
FIG. 1 describes a movable micro-mirror.

FIG. 1 presents a typical rectangular MEMS moving micro-mirror 101, anchored to a fix body 102 by two beams 103, and deflected along its central axis.

Figure 2A:
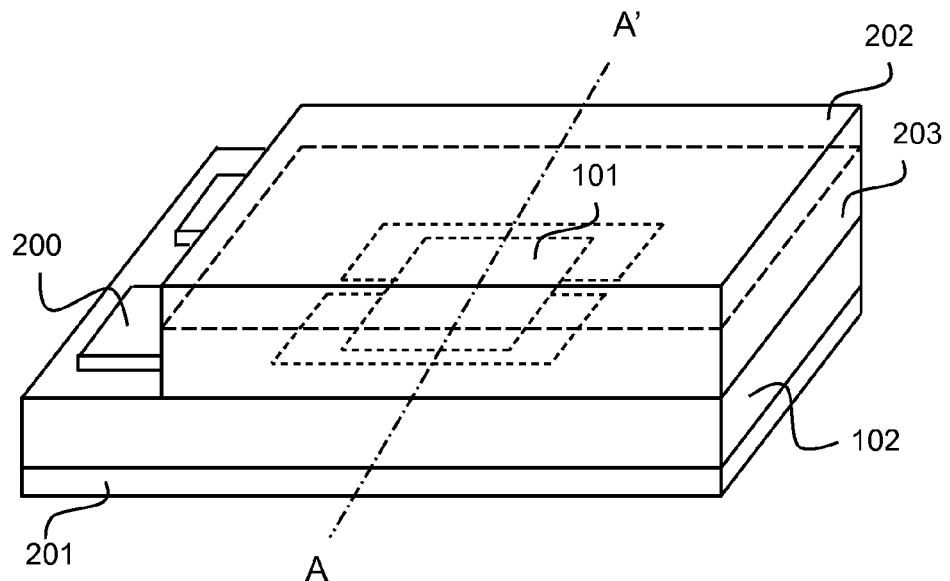
FIG. 2A and FIG. 2B describe respectively a protected micro-mirror and its cross section.
Figure 2B:
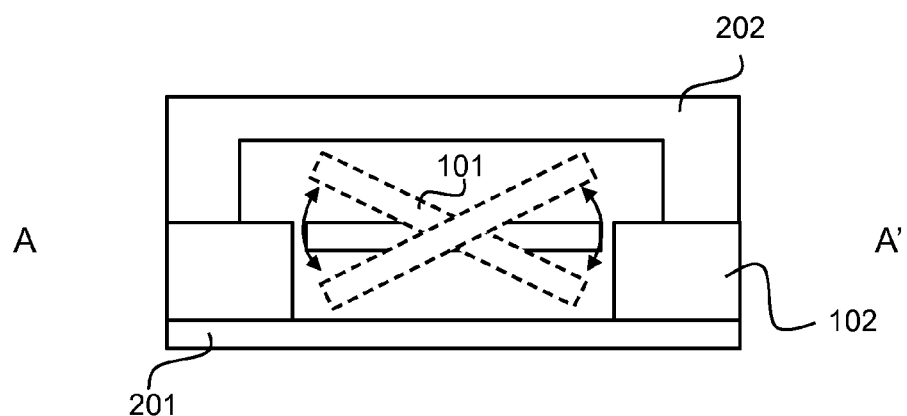

An example of known type packaged MEMS mirror is presented in FIG. 2A and FIG. 2B, where the MEMS mirror 101 is protected by transparent or semi-transparent surfaces 201 and 202 as the incoming light can either come from one side or from two sides of the mirror surfaces.

Figure 3:
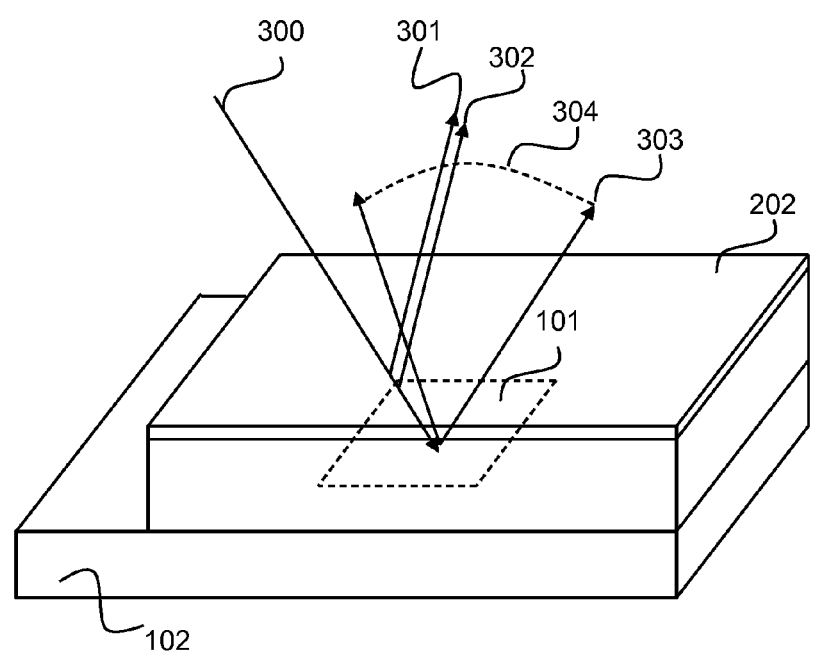
FIG. 3 presents examples of incoming light reflections on different parts of a MEMS micro-mirror.

FIG. 3 presents the parasitic reflection of an incoming light 300 at both air-window interfaces of the surface 202, resulting in 301 and 302 parasitic light reflections, and the light reflection 303 generated by the mirror itself. If the mirror is not actuated, the resulting reflection 303 is parallel to 301 and 302. When the mirror is actuated, the incoming light beam is deflected and generates a 304 reflected beam. The 304 deflected beam is a single line for a micro-mirror moving along a single rotation axis, and is a two-dimensional pattern if the micro-mirror is moving along two rotational axis.

The encapsulated MEMS micro-mirror is composed of a cap part with an optical window 202 that allows the light to penetrate and reflects on the micro-mirror surface. The cap optical window is typically made of glass, Pyrex or borofloat material and has usually a flat surface. Micro-mirror surface can also be coated with reflective material such as gold, aluminum or silver, deposited in thin film, to obtain strong light reflection in the visible and Infra-Red wavelength. Eventually, the MEMS micro-mirror chip can also be packaged by a transparent or opaque substrate 201 from the other side of the MEMS micro-mirror chip. Ideally, each of the protection substrates made of transparent material should be coated on both sides with anti-reflective coating to avoid any parasitic light reflection.

Figure 4A:
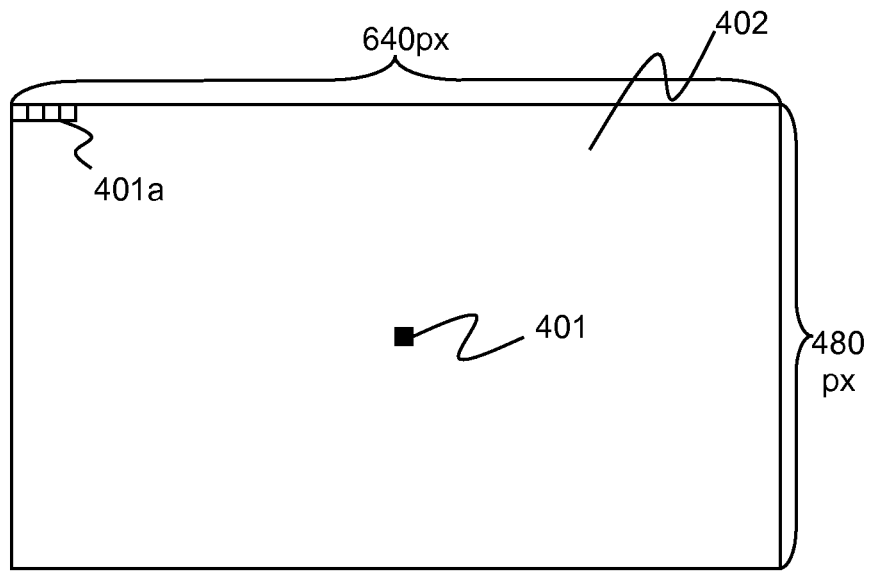
FIG. 4A, presents a schematic representation of a 640×480 pixels image with a stronger pixel light spot in the projection field.

One aspect of the invention is to avoid that the parasitic light reflects directly onto the projection field in the case of a projection application. FIG. 4A shows a projected image 402, with a resolution of 640×480 pixels, in which the parasitic light spot 401 is part of the projected image and is light intensity is much larger then the other image pixels 401a.

Figure 4B:
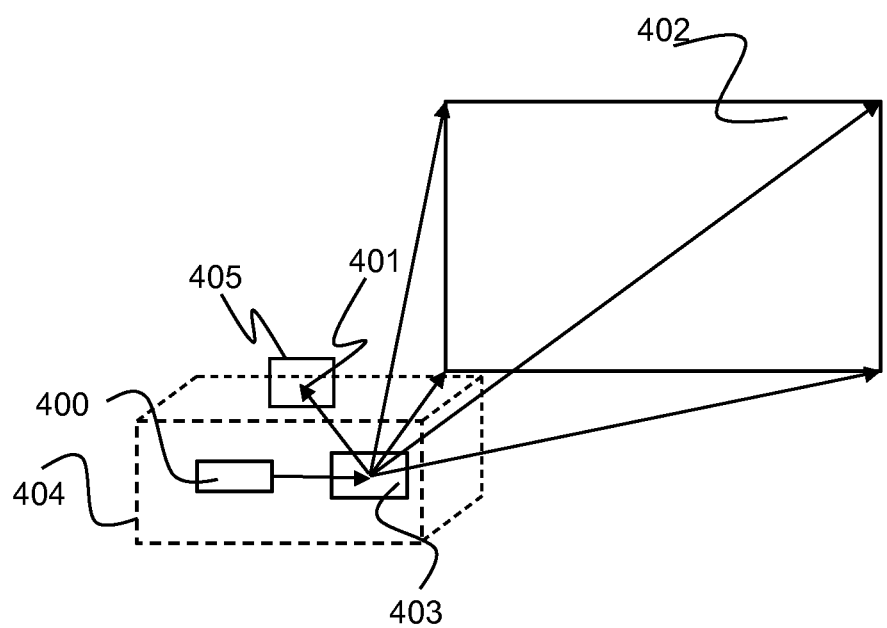
FIG. 4B is a schematic representation of a projection or scanning system comprising a light source and a micro-mirror.

The invention proposes a system that allows redirecting the parasitic light spot 401 onto a region which is outside the projection field. FIG. 4B presents a projection or scanning module 404 using such method, where the light beam, coming from the source 400, is reflected into the optical projection system chip 403, resulting in a projection image 402 and a parasitic light reflection 401 outside the desired field of projection.

Another aspect of the invention consists in reducing or suppressing speckle and therefore improves image quality.

A further aspect of the invention is to place a highly absorbent surface 405 in the path of the parasitic light in order to absorb its energy. Dark surface for example will considerably limit reflections of the parasitic light in the system.

The solution of the invention enables to deviate the parasitic incoming light source outside the projection field, while not degrading the projection image, and while reducing speckle. The proposed invention uses protection transparent or semi-transparent windows with a specific geometry.

Figure 5A:
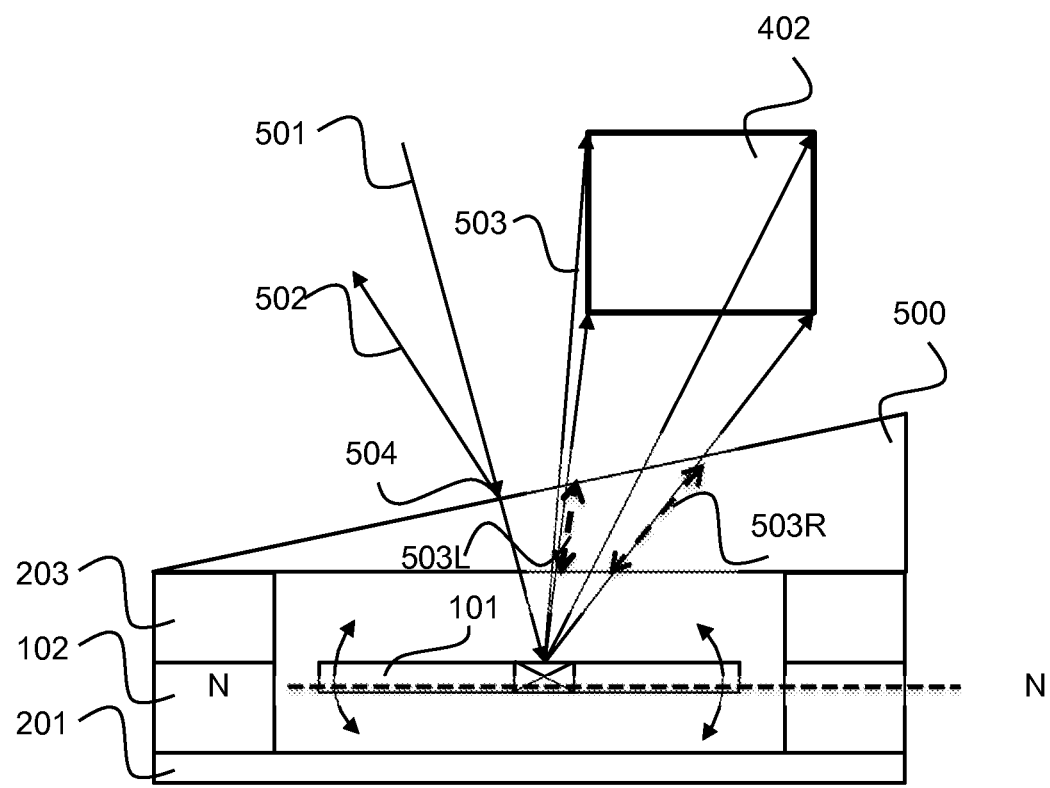
FIGS. 5A and 5B show two packaging architectures of a micro-mirror provided with an anti-speckle transparent prism in accordance with the invention, the resulting light reflections and transmission principles.

An aspect of the invention is presented in FIG. 5A where the transparent prism or window 500 allows the light to penetrate towards the mirror surface 101. In this architecture the window has a substantially triangular shape that enables the incoming light 501 to reflect the parasitic light 502 created at the air-window interface outside the desired projection field 402. Due to the proposed architecture, the parasitic light beam 502 is no longer parallel to the projection beam 503 when the micro-mirror is not actuated. Due to its substantially triangular profile, the required time for the light to pass through the prism 500 depends on the thickness of the crossing zone. For instance, in FIG. 5A, the crossing time increases from left to right. This is clearly seen when comparing the respective lengths of arrows 503L which is shorter than arrow 503R. The time difference, though extremely small, is sufficient to reduce the coherence of the emitted light and thereby reduce the perceived speckle by a viewer or a sensor, while not affecting image sharpness.

Figure 5B:
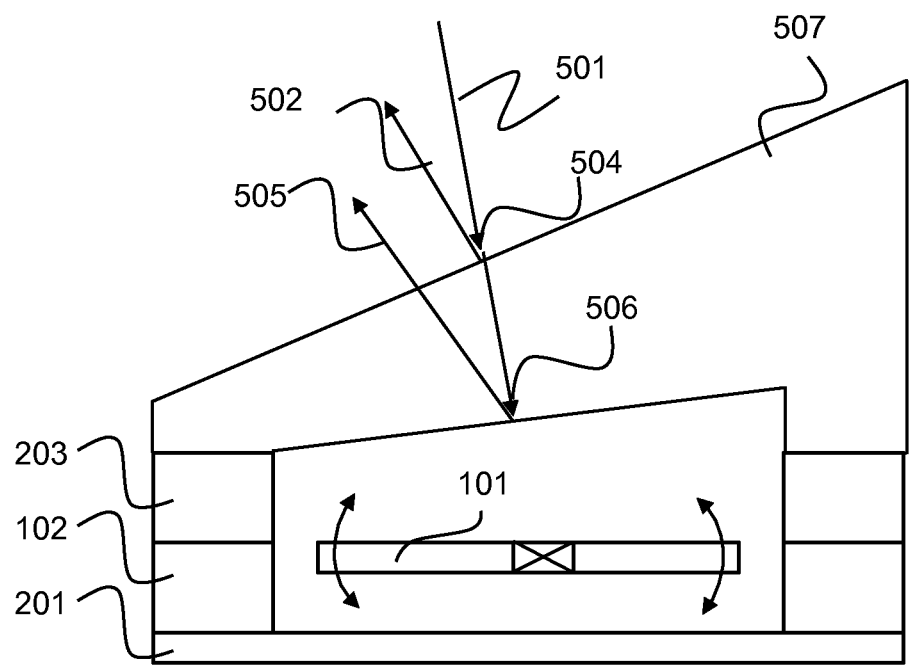

An improvement of the invention is presented in FIG. 5B, where the transparent prism or window 507 is designed in such a way that not only the parasitic light reflection 502 at the air-window interface 504 but also the parasitic light reflection 505 at the window-air interface 506, are redirected outside the projection field. In order to achieve such performance, the window 507 has a specific geometry where none of its two faces are parallel to the mirror neutral plane N-N. In order that the architecture depicted in FIG. 5B redirect the parasitic reflected light outside the projection field, the window angle should be larger than the absolute maximum deflection amplitude of the mirror.

Figure 6:
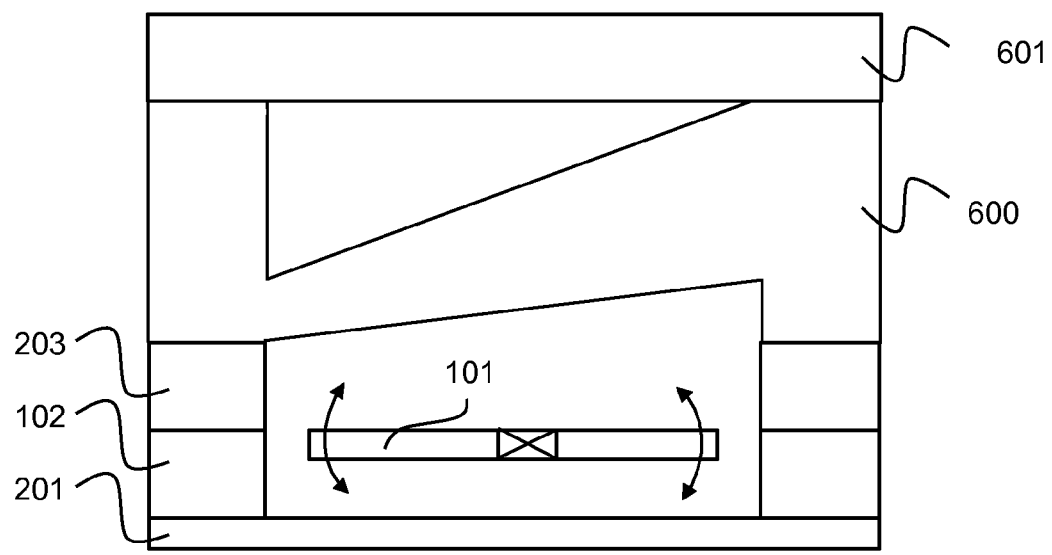
FIG. 6 presents another packaging architecture of a micro-mirror provided with an anti-speckle transparent prism in accordance with the invention.

Another aspect of the invention is related to the assembly simplicity of a device with such a window, when assembled with other devices having a flat surface. Indeed, a convenient way to assemble different components together, and especially optical components, is when all the components have flat surfaces, ideally made of similar side dimensions. FIG. 6 presents another aspect of the invention where the window has a specific shape 600 in order to provide at least two supports, outside the beam stream, thus providing a surface adapted for assembly with other component 601 having flat surface. With this architecture, oblique windows surfaces can be parallel or not, but the window angle should be larger than the absolute maximum deflection amplitude of the mirror.

Figure 7A:
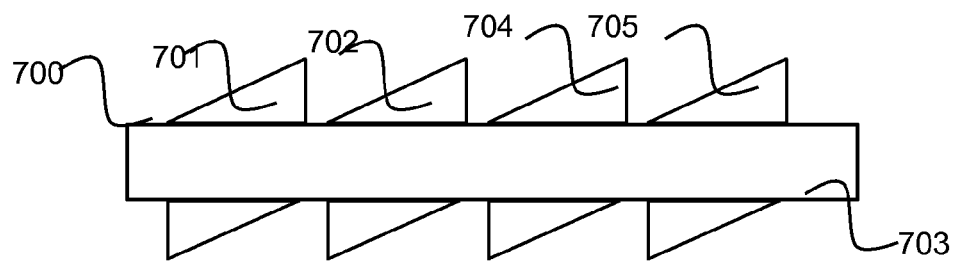
FIGS. 7A and 7B are schematic illustrations of an improved manufacturing process for an anti-speckle prism in accordance with the invention.
Figure 7B:
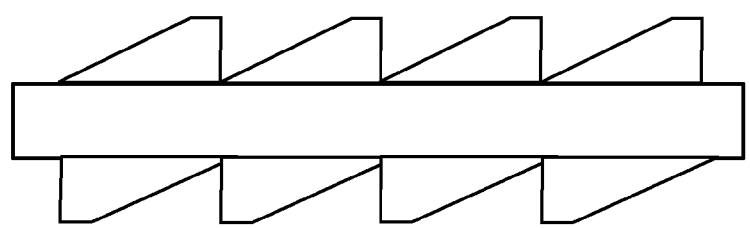

All of these architectures presented in FIGS. 5A, 5B and 6 can be done using different techniques, including plastic injection, PMMA molding or glass molding. Glass molding technique uses a pattern where the glass is melted. A further improvement of the invention in order to simplify the manufacturing of such a structure is to use a standard flat window surface 700, 703 and glue or attach to it the patterned structure 701, 702, 704 and 705, as presented in FIGS. 7A and 7B. Ideally these structures will have similar refractive index as the windows 700, 703 and ideally the attached technique is by using glue with also similar refractive index.

Figure 8:
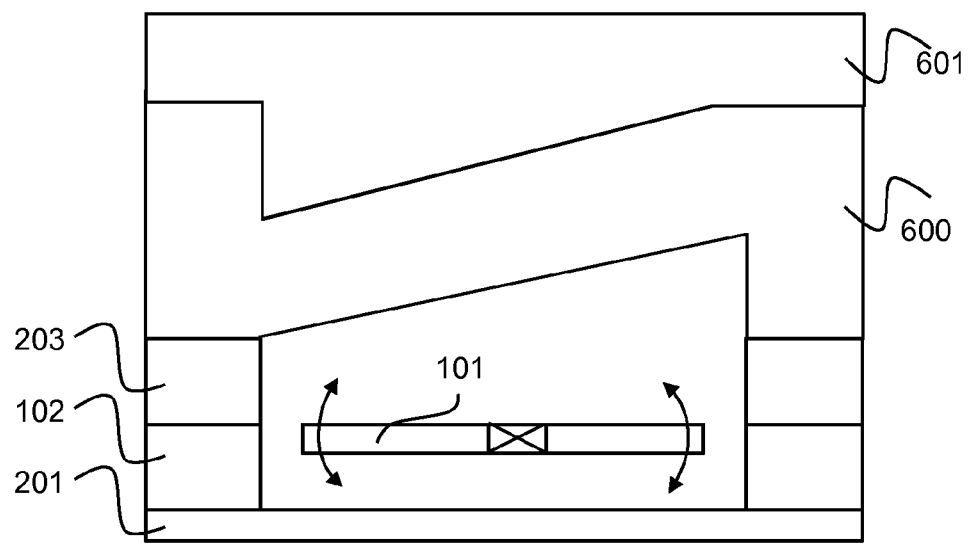
FIG. 8 shows a packaged micro-mirror with a further example of a micro-mirror provided with an anti-speckle transparent prism in accordance with the invention.

Still another aspect of the invention is to make the plate 601 with a geometry enabling this component to adapt to the shape of the window 600, in such way that there is no airspace between the two layers, such as presented in FIG. 8.

Another improvement of the invention is to have the protected window or prism directly made of quarter-wave plate material. Indeed such system decreases the number of components of the projection system and minimizes the light energy loss as the number of air-material interfaces is reduces. Standard quarter-wave plates are usually made of quartz material that can be shaped in the desired architecture such as the ones presented in FIGS. 5B and 6, to replace respectively 507 and 600 components.

As micro-mirrors can be packaged on both sides of the chip, for the applications requiring that the light is applied from both sides of the mirror, the present invention and architecture is also adapted by attaching described window geometries on each side.

In another variant, the prism and/or window is substantially parallelepiped with a gradient of refractive index from one side to the other, thus resulting in a similar phase difference of parallel light beams passing through the prism or window. Such an embodiment may be used with an additional transparent element adequately positioned to avoid parasitic reflection of the light on the protection window.

The prism may be attached to the micro-mirror chip using any techniques, including but not limited to gluing, glass frit bonding, anodic bonding, eutectic bonding, molecular bonding, fusion bonding, low temperature direct bonding, soft soldering, metal thermo compression bonding, bonding with reactive multilayers, laser bonding, polymer attach, etc.

The invention claimed is:

1. Optical MEMS scanning micro-mirror comprising:
  a movable scanning micro-mirror, being pivotally connected to a MEMS body substantially surrounding the lateral sides of the micro-mirror, and provided with neutral axis N-N corresponding to a non pivoted position of said micro-mirror,
  a transparent prism substantially covering the reflection side of the micro-mirror; and
  wherein said prism has an outer face and an inner face, wherein said outer face is not parallel to said inner face, and wherein the prism is arranged such that, light incident on the movable scanning micro-mirror can pass through the prism so as to provide an anti-reflection effect and light reflected by the movable scanning micro-mirror can pass through the prism to provide an anti-speckle effect.

2. Optical MEMS scanning micro-mirror according to claim 1, wherein said outer face is non-parallel to the micromirror neutral plane N-N.

3. Optical MEMS scanning micro-mirror according to claim 2, wherein the anti-speckle prism has its inner face also non-parallel to the micro-mirror neutral plane N-N.

4. Optical MEMS scanning micro-mirror according to claim 1, wherein the anti-speckle prism is provided with a transparent cover having a substantially flat outer face.

5. Optical MEMS scanning micro-mirror according to claim 4, wherein at least a portion of the cover inner face is substantially parallel with the prism outer face.

6. Optical MEMS scanning micro-mirror according to claim 4, wherein at least a portion of the prism outer face and the cover inner face are in direct contact.

7. Optical MEMS scanning micro-mirror according to claim 4, wherein the cover inner face is substantially parallel with the micro-mirror neutral plane N-N.

8. Optical MEMS scanning micro-mirror according to claim 1, wherein the scanning mirror pivoting angle and dimensions and the prism dimensions are linked together and determined so that the light emitted from the scanning mirror is oriented to pass through the prism.

9. Optical MEMS scanning micro-mirror according to claim 1, wherein the prism is provided with an absorbent surface to absorb parasitic light.

10. Optical MEMS scanning micro-mirror according to claim 1, wherein the prism is advantageously provided with a triangular profile.

11. Optical MEMS scanning micro-mirror according to claim 1, wherein the prism is manufactured using a transparent portion provided with a plurality of successive structures made of discontinuous rectilinear segments and aligned on the outer face thereof.

12. Optical MEMS scanning micro-mirror according to claim 11, wherein the successive structures are substantially triangular.

13. A micro-projection system for projecting light on a projection surface comprising:
  at least one coherent light source;
  optical elements, in the optical path between said coherent light source and said projection surface, and
  an optical MEMS scanning micro-mirror according to claim 1.

14. A micro-projection system according to claim 13, comprising a transparent cover or a prism made of quarter-wave plate material.

15. A method for reducing speckle in a micro-projection system adapted for projecting light on a projection surface comprising:
  providing a light with at least one coherent light source;
  directing light from the light source to the projection surface;
  providing a scanning micro-mirror for deviating light from said light source so as to scan a projected image onto said projecting surface, said micro-mirror being provided with neutral axis N-N corresponding to a non pivoted position of said micro-mirror; and
  covering the reflection side of the micro-mirror with a transparent prism, wherein said prism has an outer face and an inner face, wherein said outer face is not parallel to said inner face, and arranging the prism such that, light incident on the movable scanning micro-mirror can pass through the prism so as to provide an anti-reflection effect and light reflected by the movable scanning micro-mirror can pass through the prism to provide an anti-speckle effect.

* * * * *